(12) United States Patent
Tatekawa

(10) Patent No.: US 7,339,858 B2
(45) Date of Patent: Mar. 4, 2008

(54) DISK DEVICE, AND METHODS FOR CHECKING, EJECTING, AND LOADING DISK IN DISK DEVICE

(75) Inventor: Tsutomu Tatekawa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 297 days.

(21) Appl. No.: 11/191,165

(22) Filed: Jul. 27, 2005

(65) Prior Publication Data

US 2006/0044954 A1 Mar. 2, 2006

(30) Foreign Application Priority Data

Aug. 24, 2004 (JP) ............................. 2004-243272

(51) Int. Cl.
*G11B 17/22* (2006.01)
*G11B 17/12* (2006.01)
(52) U.S. Cl. ................................ 369/30.85; 369/30.78; 369/30.92; 720/662; 720/690
(58) Field of Classification Search ................ 720/662, 720/690; 369/30.85, 30.78, 30.92
See application file for complete search history.

(56) References Cited

U.S. PATENT DOCUMENTS

| 5,682,364 | A | * | 10/1997 | Ogawa | 369/30.81 |
| 5,864,522 | A | * | 1/1999 | Sugano et al. | 369/30.29 |
| 5,917,787 | A | * | 6/1999 | Tsuchiya et al. | 369/30.81 |
| 5,970,040 | A | * | 10/1999 | Bando | 369/30.9 |
| 5,970,043 | A | * | 10/1999 | Fujisawa | 720/714 |
| 6,301,205 | B1 | * | 10/2001 | Nakamichi | 369/36.01 |
| 6,466,524 | B1 | * | 10/2002 | Fujimoto | 369/30.85 |
| 6,507,542 | B1 | * | 1/2003 | Hopf et al. | 369/30.85 |
| 6,751,181 | B1 | * | 6/2004 | Watanabe et al. | 369/192.1 |
| 6,832,382 | B2 | | 12/2004 | Ito et al. | |
| 2001/0012230 | A1 | * | 8/2001 | Takemae et al. | 365/222 |

FOREIGN PATENT DOCUMENTS

| JP | 11-283318 | 10/1999 |
| JP | 2002-032950 | 1/2002 |

* cited by examiner

*Primary Examiner*—Brian E. Miller
*Assistant Examiner*—Matthew G. Kayrish
(74) *Attorney, Agent, or Firm*—Brinks Hofer Gilson & Lione

(57) ABSTRACT

A disk device includes a disk tray capable of accommodating disks by stacking; a first driving motor for transferring the disk tray in the disk-stacking direction; a driving unit including an optical head for reading out data recorded in the disks, and a supporting component for supporting the rotation of the disks; a second driving motor for selectively transferring the driving unit between a playback position where the driving unit overlaps with the disks in the disk-stacking direction and a retracted position where the driving unit does not overlap with the disks in the disk-stacking direction; disk detectors for determining whether the disk tray accommodates disks at predetermined positions; and a controlling section for transferring the disk tray in the disk-stacking direction while the driving unit is kept at the playback position when the disk tray does not accommodate disks at predetermined positions on the basis of detection results of the disks during disk checks.

14 Claims, 11 Drawing Sheets

FIG. 10

| | |
|---|---|
| SUPPORTING MEMBER 14-1 | DISK EXISTS |
| SUPPORTING MEMBER 14-2 | DISK EXISTS |
| SUPPORTING MEMBER 14-3 | DISK EXISTS |
| SUPPORTING MEMBER 14-4 | NO DISK |
| SUPPORTING MEMBER 14-5 | NO DISK |

DISK DEVICE, AND METHODS FOR CHECKING, EJECTING, AND LOADING DISK IN DISK DEVICE

BACKGROUND OF THE INVENTION

1. Field of the Invention

The present invention relates to disk devices capable of recording and/or playing back disks such as compact disks (CDs) or digital versatile disks (DVDs), and in particular, relates to disk devices of a changer type capable of playing back a disk selected from a plurality of accommodated disks.

2. Description of the Related Art

A car-mounted disk device of a changer type includes a disk tray or a stock section into which a plurality of disks are loaded from a loading slot so as to be stacked in the axial direction. When a desired disk is selected from the disks in the disk tray, the disk is rotated by a driving unit, and the data on the disk is read out by an optical head.

Japanese Unexamined Patent Application Publication No. 11-283318 discloses a disk device of a changer type that detects the presence of disks in a changer by photosensors whose number equals that of acceptable disks. Accordingly, the presence of the disks accommodated in the changer can be immediately detected.

Japanese Unexamined Patent Application Publication No. 2002-32950 discloses a disk device of a disk selection type. In this disk device, when a driving unit is transferred to a retracted position, a rotational member is disposed at a position in a retraction space, and an optical head is disposed at another position in the retraction space separately. Thus, the driving unit can be accommodated in a casing with a limited capacity.

The disk device of the changer type has a so-called disk-check function for checking the content of the disks accommodated therein at power-on. When the disk-check function is performed, the table of contents (TOC) of all the accommodated disks is read out and shown on a display as a list. For example, a list of names of albums and artists is shown for music CDs such that users can select a disk to be played back with reference to the information.

However, when performing the disk-check function, the known technology has the following problems: The mounting space for the disk device of the changer type, in particular, an in-dash disk device with 1-DIN size, is limited; and accordingly, the space inside the casing is also limited. Therefore, the disk device transfers the disk tray accommodating the plurality of disks in the stacking direction of the disks, and horizontally transfers the driving unit between a playback position where the driving unit overlaps with the disks in the disk-stacking direction and the retracted position where the driving unit does not overlap with the disks. When a desired disk is selected, the height of the disk tray in the disk-stacking direction is adjusted, and then the driving unit is transferred to the playback position. Thus, the selected disk is read.

The disk checks in such a disk device are performed along an operational flow shown in FIG. 11. When the disk device is powered on (Step S301), the driving unit is transferred to the retracted position (Step S302). Then, the height of the disk tray is changed (Step S303), and a first disk (for example, the lowest disk) is selected (Step S304). Next, the driving unit is transferred to the playback position (Step S305), and the TOC of the disk is read by the driving unit (Step S306). The driving unit is then transferred to the retracted position (Step S307). Subsequently, the operations from Step S302 to Step S306 are repeated by a number of times equal to the number of acceptable disks in the disk tray (Step S308).

In this manner, the TOC of all the disks accommodated in the disk tray is read. When the disk tray accommodates the disks up to the capacity, the above-described steps are all necessary. However, even when the disk tray accommodates disks less than the capacity and no disk is accommodated in the selected position of the disk tray, the driving unit is transferred from the retracted position to the playback position. These operations are unnecessary and consequently waste time for the disk checks more than necessary.

SUMMARY OF THE INVENTION

Accordingly, it is an object of the present invention to provide a disk device capable of checking, ejecting, and loading disks efficiently with minimum steps; and methods for checking, ejecting, and loading disks in a disk device.

The disk device according to the present invention includes a disk tray capable of accommodating disks that are stacked in the axial direction; a first transferring component for transferring the disk tray in the disk-stacking direction; a driving unit comprising a head for optically reading out data recorded in the disks, and a supporting component for supporting the rotation of the disks; a second transferring component for selectively transferring the driving unit between a playback position where the driving unit overlaps with the disks in the disk-stacking direction and a retracted position where the driving unit does not overlap with the disks in the disk-stacking direction; disk-detecting units for determining whether the disk tray accommodates disks at predetermined positions; and a controlling section for transferring the disk tray in the disk-stacking direction with the first transferring component while the driving unit is kept at the playback position when the disk tray does not accommodate disks at predetermined positions on the basis of the detection results of the disk-detecting units during disk checks of all the disks accommodated in the disk tray.

The controlling section may transfer the disk tray such that a predetermined disk accommodated in the disk tray is disposed at a selected position for readout by the driving unit. Each of the disk-detecting units may include an adjustable member that changes position when the disk tray accommodates a disk at a predetermined position, and a sensor for detecting the position of the adjustable member.

In addition to the disk checks, the present invention is applicable to cases where the disks accommodated in the disk tray are ejected (disk-ejecting function), and where disks are loaded into the disk tray (disk-loading function). Preferably, the present invention is applicable to cases where a plurality of disks are successively ejected (all-ejecting function) and loaded (all-loading function) in response to instructions of users.

Furthermore, the method for checking the disks in the disk device according to the present invention, the disk device including a disk tray capable of accommodating the disks that are stacked in the axial direction, a first transferring component for transferring the disk tray in the disk-stacking direction, a driving unit including a head for optically reading out data recorded in the disks and a supporting component for supporting the rotation of the disks, and a second transferring component for selectively transferring the driving unit between a playback position where the driving unit overlaps with the disks in the disk-stacking direction and a retracted position where the driving unit does not overlap with the disks in the disk-stacking direction, includes the steps of determining whether the disk tray accommodates disks at predetermined positions for checking all the disks accommodated in the disk tray, transferring the disk tray in the disk-stacking direction with the first transferring component while the driving unit is kept at the playback position when the disk tray does not accommodate disks at predetermined positions on the basis of the detection results, and transferring the disk tray such that a predetermined disk accommodated in the disk tray is disposed at a selected position for readout by the driving unit.

According to the disk device of the present invention, the disks can be checked efficiently in a short time even when the disk tray accommodates disks less than the capacity. Also, a plurality of disks can be efficiently ejected and loaded in a short time.

BRIEF DESCRIPTION OF THE DRAWINGS

FIG. 10 is a table illustrating the relationships between supporting members of the disk tray and the presence of disks.

DESCRIPTION OF THE PREFERRED EMBODIMENTS

Figure 1A:
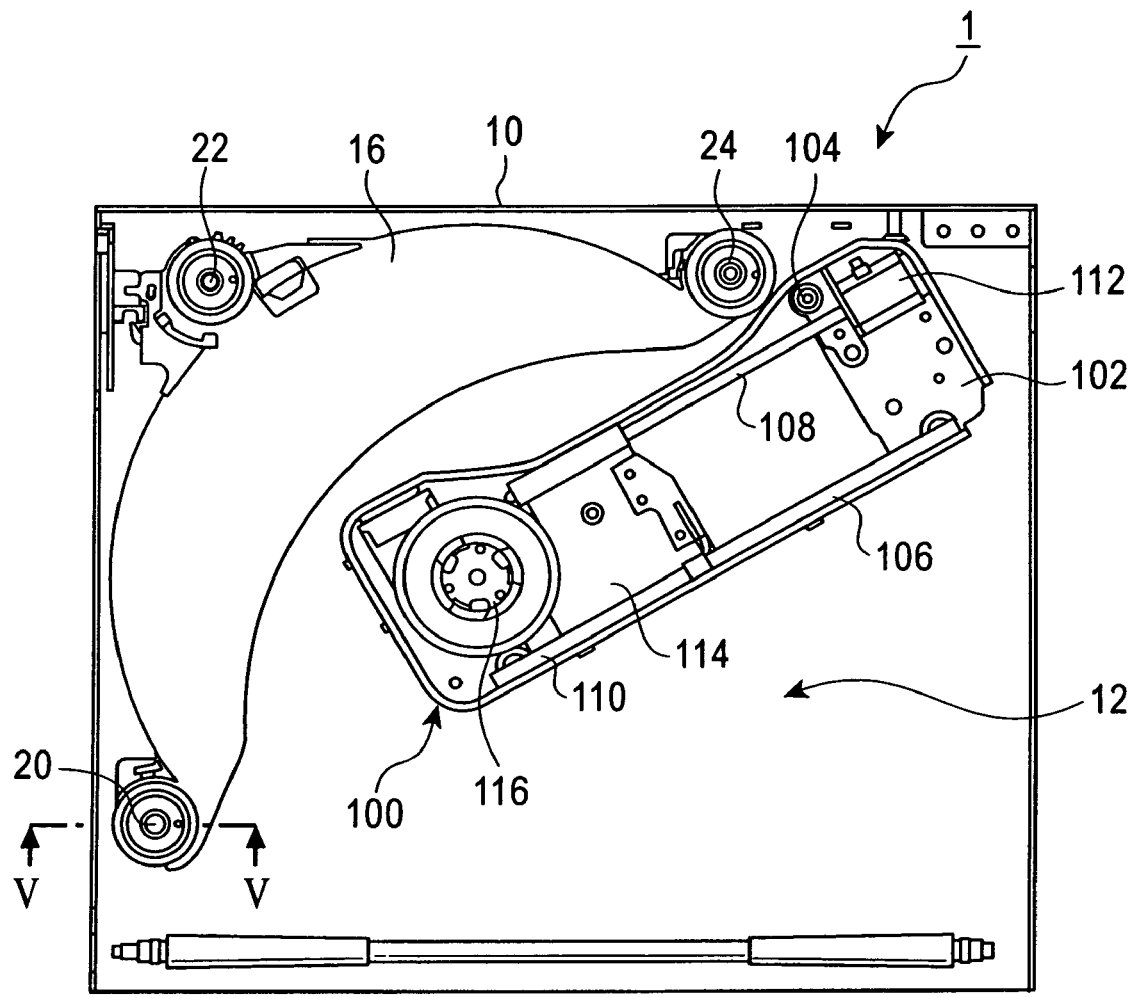
FIGS. 1A and 1B are a plan view and a side view, respectively, of a disk device according to an embodiment of the present invention while no disk is accommodated therein and a driving unit is disposed at a playback position.

A disk device according to the present invention is preferably used as an in-dash disk device of a changer type. Embodiments of the present invention will now be described with reference to the drawings.

A disk device 1 according to this embodiment can accommodate various types of disks such as CDs or DVDs in an accommodation space 12 inside a casing 10. The disk device 1 can record and/or play back a disk selected from the accommodated disks by a driving unit 100.

A face unit (not shown) including a display panel and switches attached thereto is disposed at the front of the casing 10. The face unit has a slit loading slot 26 extending in the width direction. Disks D inserted from the loading slot 26 are loaded into the casing 10 by a guiding unit and a transporting unit (not shown) disposed inside the casing 10 adjacent to the side of the casing 10. Conversely, the accommodated disks are unloaded from the loading slot 26 to the exterior by the transporting unit.

Users can perform an all-ejecting function for ejecting all the accommodated disks, or an all-loading function for loading disks up to the capacity of the disk device by operational switches.

Figure 5A:
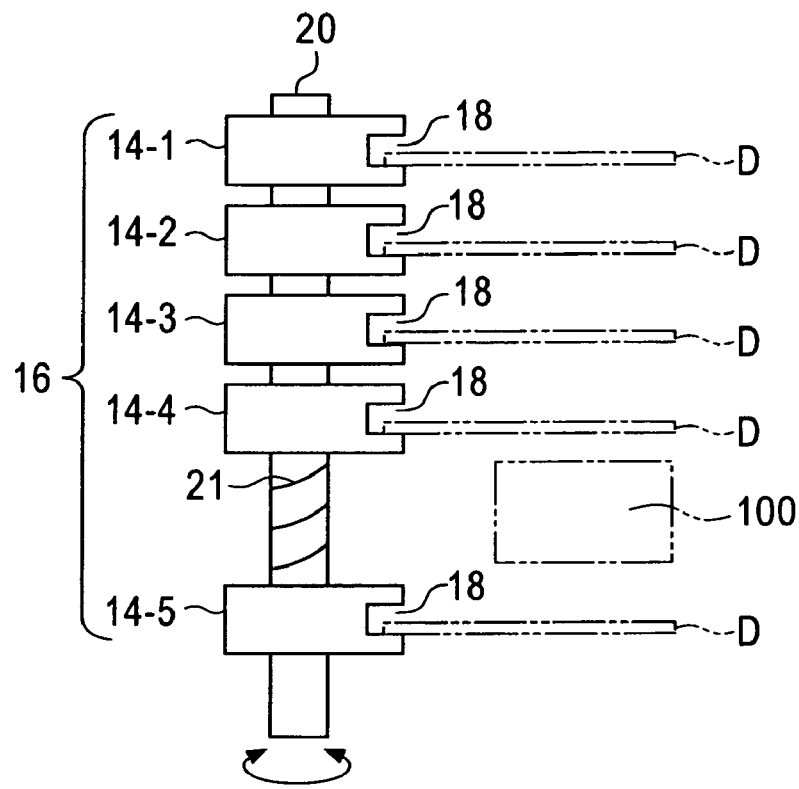
FIGS. 5A and 5B are schematic cross-sectional views illustrating the structure of a disk tray taken along line V-V in FIG. 1A.
Figure 5B:
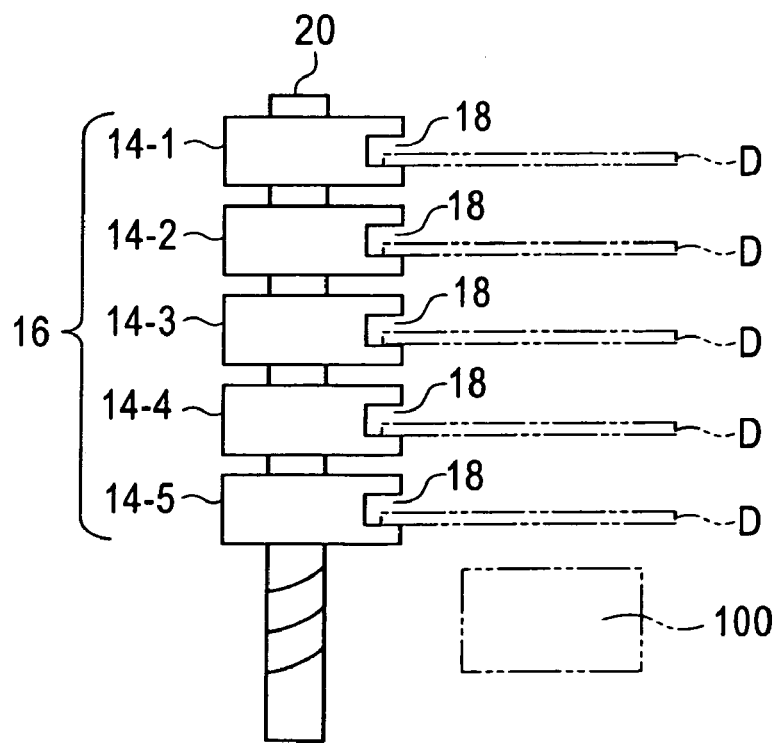

A disk tray 16 including five fan-shaped supporting members 14 (14-1, 14-2, 14-3, 14-4, and 14-5) stacked in the height direction of the casing is disposed in the accommodation space 12. As shown in FIGS. 5A and 5B, the supporting members 14 each have a groove 18 formed along the outer periphery thereof for receiving and supporting the outer edge of the disk D. In this embodiment, the disk tray 16 can accommodate up to five disks D.

The disk tray 16 is supported by transfer shafts 20, 22, and 24 vertically extending inside the casing 10, and is vertically transferred by these transfer shafts. The transfer shafts 20, 22, and 24 each have a spiral groove 21 on the outer periphery thereof as shown in FIGS. 5A and 5B. The pitches of the spiral grooves 21 are small at the upper and lower positions of the transfer shafts, whereas the pitches are large at the intermediate position. The supporting members 14 include protrusions meshing with the spiral grooves 21 of the transfer shafts.

When the transfer shafts 20, 22, and 24 are synchronously rotated by a motor (not shown), the supporting members 14 are vertically transferred by the spiral grooves 21. At this time, according to the pitch variation of the spiral grooves 21 of the transfer shafts 20, 22, and 24, a vertical distance between two adjacent supporting members 14 at the intermediate position of the transfer shafts is large, and those at the upper and lower positions are small.

Figure 2A:
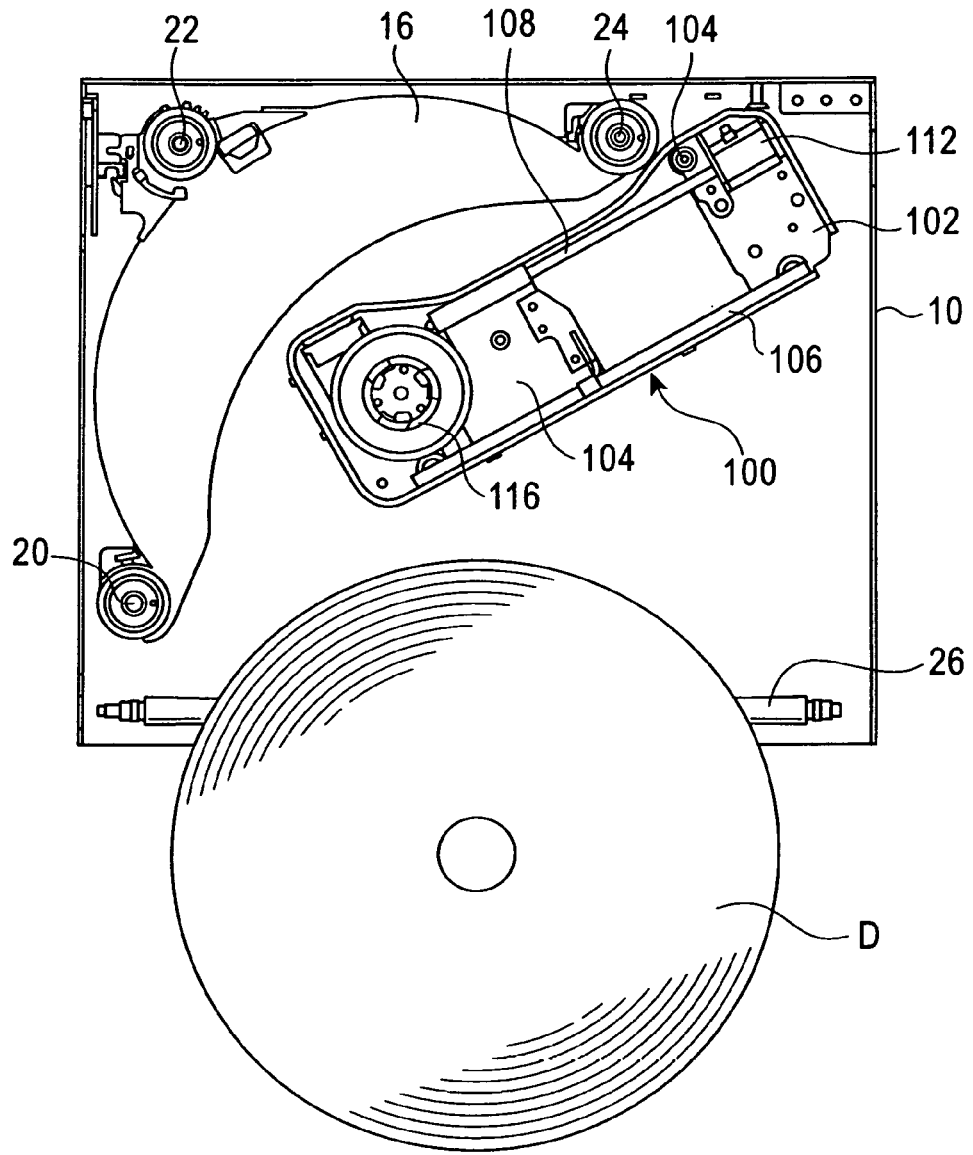
FIGS. 2A and 2B are a plan view and a side view, respectively, of the disk device while a disk is loaded into the disk device or the disk is ejected from the disk device.
Figure 2B:
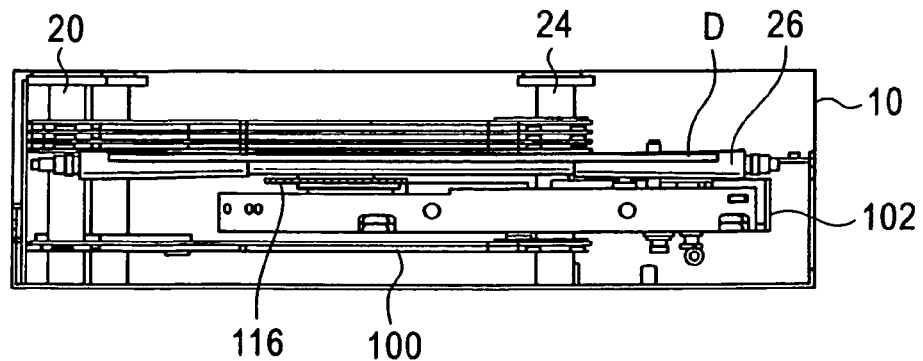

The transfer shafts 20, 22, and 24 are rotated so as to transfer one of the supporting members 14 to a selected position (referred to as selected position hereafter) for playback or ejecting. The supporting member 14 at the selected position has a large space thereunder, and the driving unit 100 moves to the space. FIG. 5A illustrates a state where the supporting member 14-4 is at the selected position with a relatively large space thereunder. The supporting member 14 at the selected position is at the same level as the loading slot 26 formed at the front of the casing. The supporting member 14 accommodates one of the disks D loaded from the loading slot 26, or ejects the disk D accommodated in the supporting member 14 from the loading slot 26 to the exterior (see FIGS. 2A and 2B).

The driving unit 100 includes a supporting member 102 at one end thereof. The supporting member 102 is fixed to the casing 10 through a supporting shaft 104 so as to be rotatable. A guiding shaft 106 and a feed screw shaft 108 parallel to each other extend from the supporting member 102. A turntable base 110 is attached to the guiding shaft 106 and the feed screw shaft 108. That is to say, the guiding shaft 106 and the feed screw shaft 108 are secured between the supporting member 102 and the turntable base 110 disposed at opposite ends of the shafts so as to be rotatable. The feed screw shaft 108 is rotated by a sled motor 112 disposed on the supporting member 102.

An optical head 114 is supported by the guiding shaft 106 and the feed screw shaft 108. The optical head 114 includes a bearing member and a female screw member fixed thereto. The guiding shaft 106 is held in sliding contact with the bearing member, and the feed screw shaft 108 screws into the female screw member. The optical head 114 includes light-emitting elements, light-receiving elements, and optical components for guiding light beams; and optically reads from and writes to the disk D.

A spindle motor is disposed under the turntable base 110, and a turntable 116 rotated by the spindle motor is disposed on the turntable base 110. The turntable 116 includes a self-clamping mechanism for clamping the center hole of the disk D in the supporting member at the selected position.

Figure 1B:
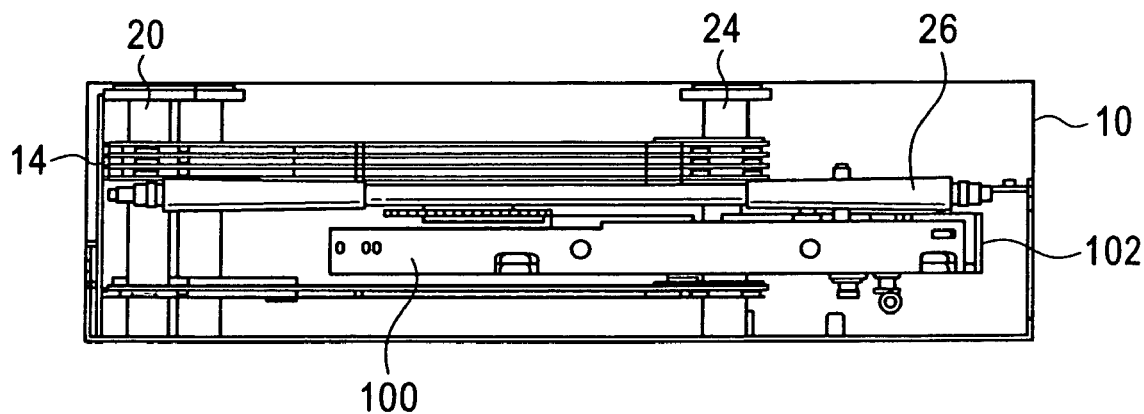
Figure 3A:
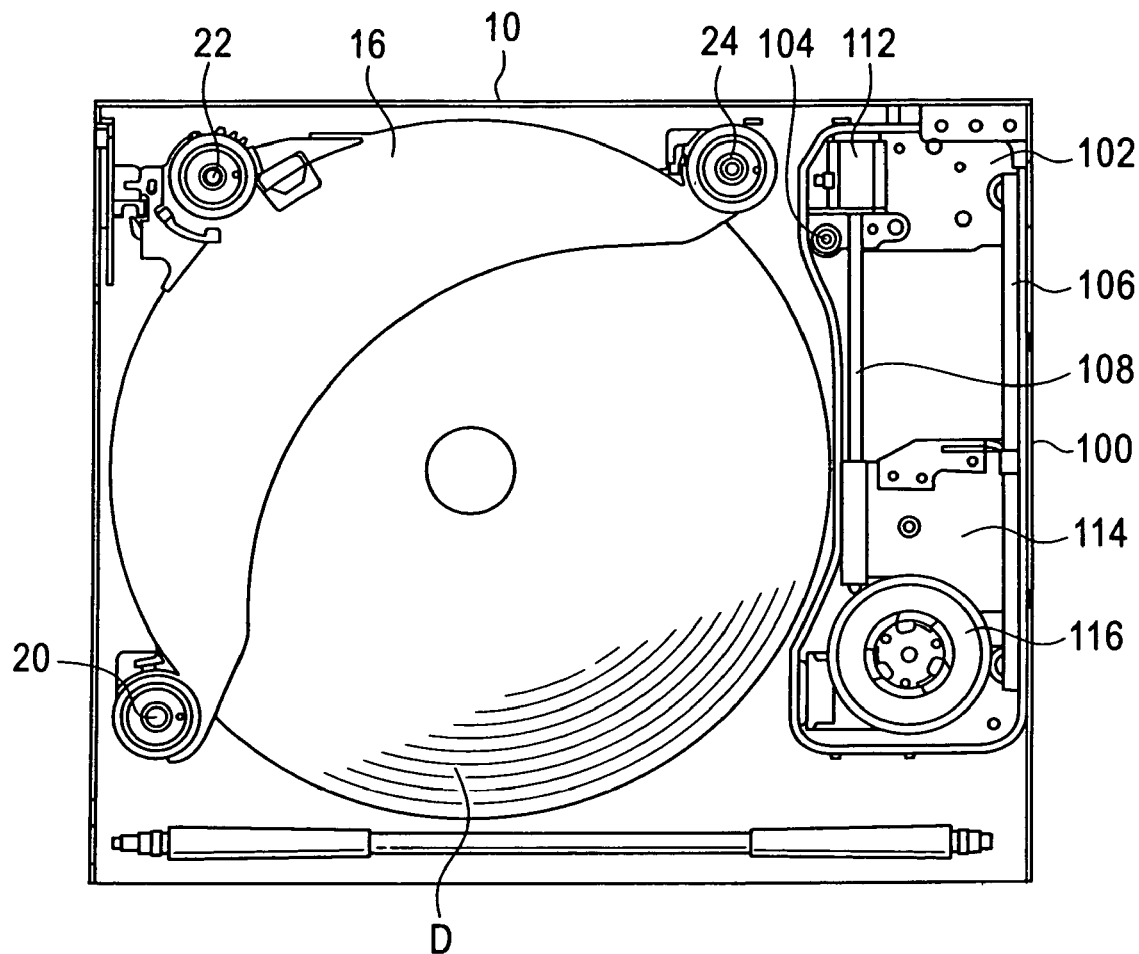
FIGS. 3A and 3B are a plan view and a side view, respectively, of the disk device while the disk is accommodated therein and the driving unit is disposed at a retracted position.
Figure 3B:
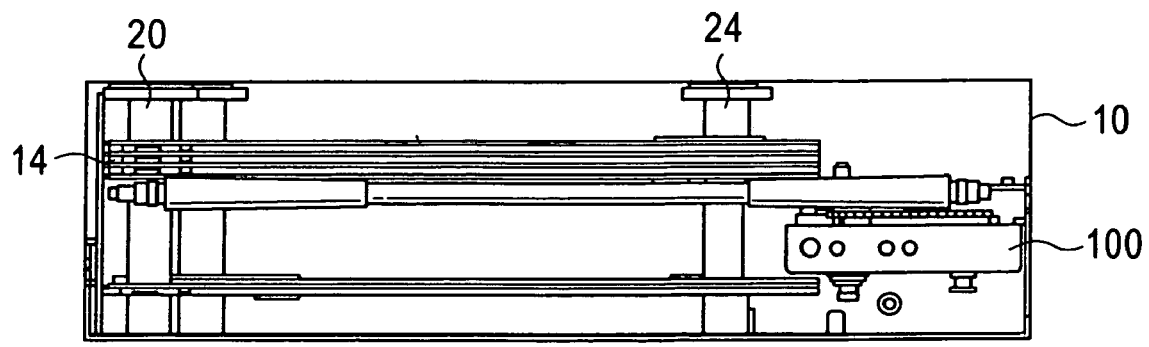

The height of the driving unit 100 is set such that the driving unit 100 can enter a space between the disk at the selected position and the disk immediately below the disk at the selected position. The driving unit 100 can rotate around the supporting shaft 104 by the motor so as to move to the playback position shown in FIGS. 1A and 1B, or to the retracted position shown in FIGS. 3A and 3B.

Figure 6:
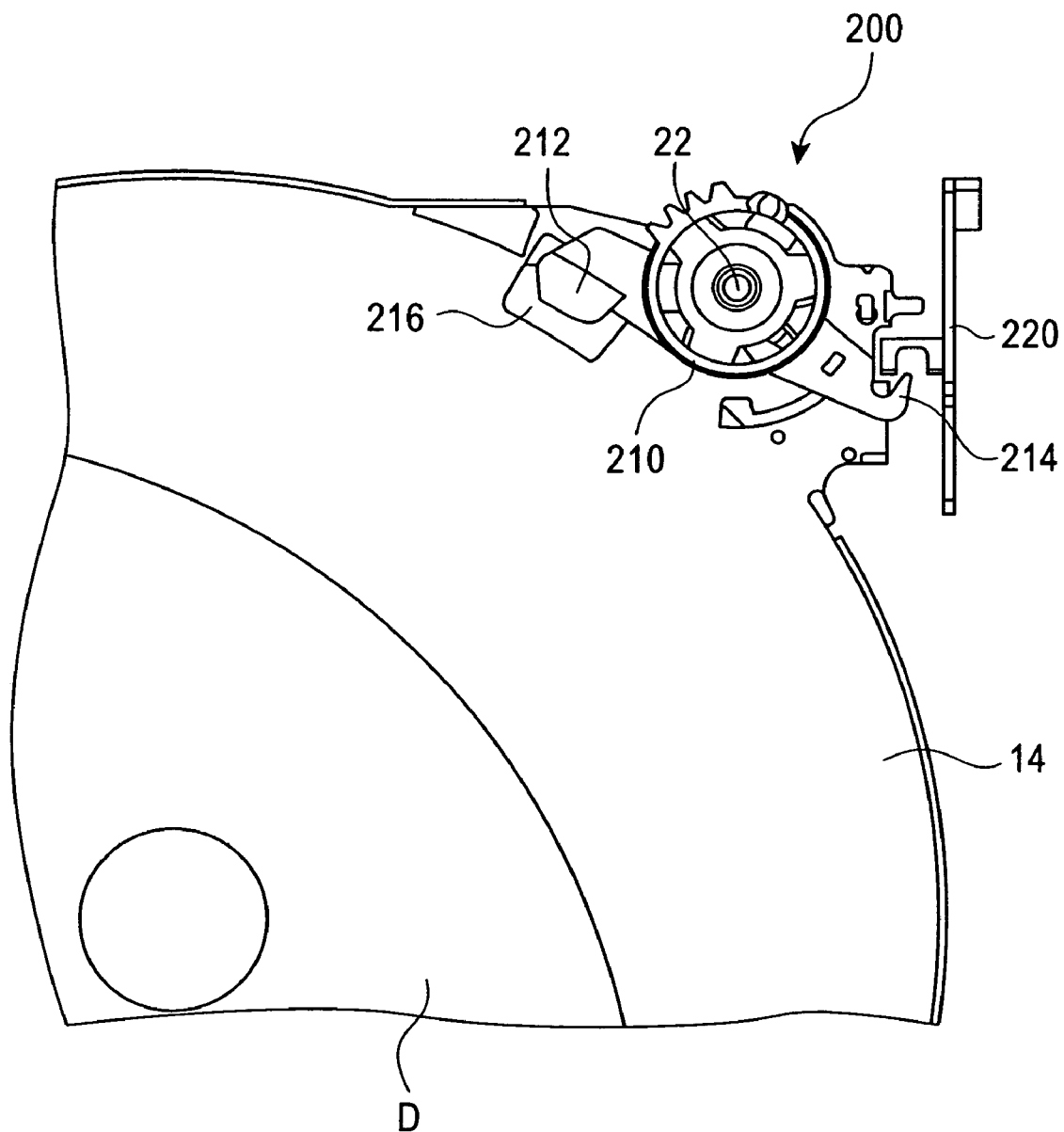
FIG. 6 illustrates the structure of a disk detector.

Moreover, the disk tray 16 includes disk detectors for detecting the presence of the disks D. FIG. 6 illustrates one of the disk detectors in detail. A disk detector 200 is provided for each of the five supporting members 14-1, 14-2, 14-3, 14-4, and 14-5 of the disk tray 16. The disk detector 200 includes a rotating lever 210 and a photosensor 220. The rotating lever 210 is attached to the transfer shaft 22 so as to be rotatable. A contact portion 212 that comes into contact with the outer edge of the disk D in the supporting member 14 is disposed at one end of the rotating lever 210, and a detecting portion 214 is disposed at the other end of the rotating lever 210. The rotating lever 210 is biased counterclockwise by a spring (not shown) such that the detecting portion 214 detects an OFF state by means of the photosensor 220 while the disk is not accommodated. Furthermore, the supporting member 14 has a cutout 216 at part of the outer periphery thereof such that the contact portion 212 of the rotating lever 210 faces the interior of the groove 18 through the cutout 216. When the disk D is fitted into the groove 18 of the supporting member 14, the outer edge of the disk D rotates the contact portion 212 clockwise, and the detecting portion 214 is separated from the photosensor 220. Thus, the detecting portion 214 detects an ON state. FIG. 6 illustrates the state where the disk is accommodated in the supporting member 14, and the detecting portion 214 detects the ON state.

Figure 7:
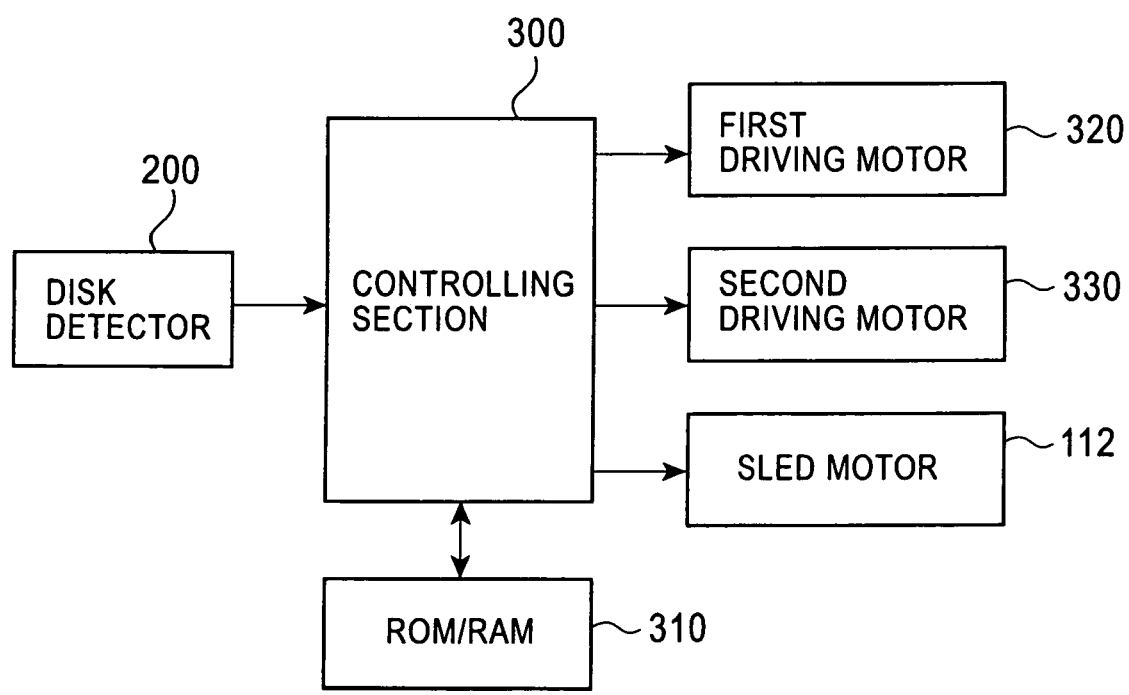
FIG. 7 is a block diagram illustrating electrical operations of the disk device.

A circuit board having electronic circuit parts for controlling the motors of the disk device mounted thereon is accommodated inside the casing 10. FIG. 7 is a block diagram illustrating electrical operations of the disk device. As shown in the drawing, a controlling section 300 including a microcomputer and the like is controlled according to programs stored in a memory (ROM/RAM) 310. The controlling section 300 receives detection results from the disk detectors 200, and controls a first driving motor 320 for the disk tray and a second driving motor 330 for the driving unit in response to the results. The first driving motor 320 rotates the transfer shafts 20, 22, and 24 that are joined to the supporting members 14. The second driving motor 330 rotates the supporting shaft 104 that is joined to the driving unit 100. Moreover, the controlling section 300 controls the position of the sled motor 112 on the basis of signals read by the optical head 114.

Figure 8:
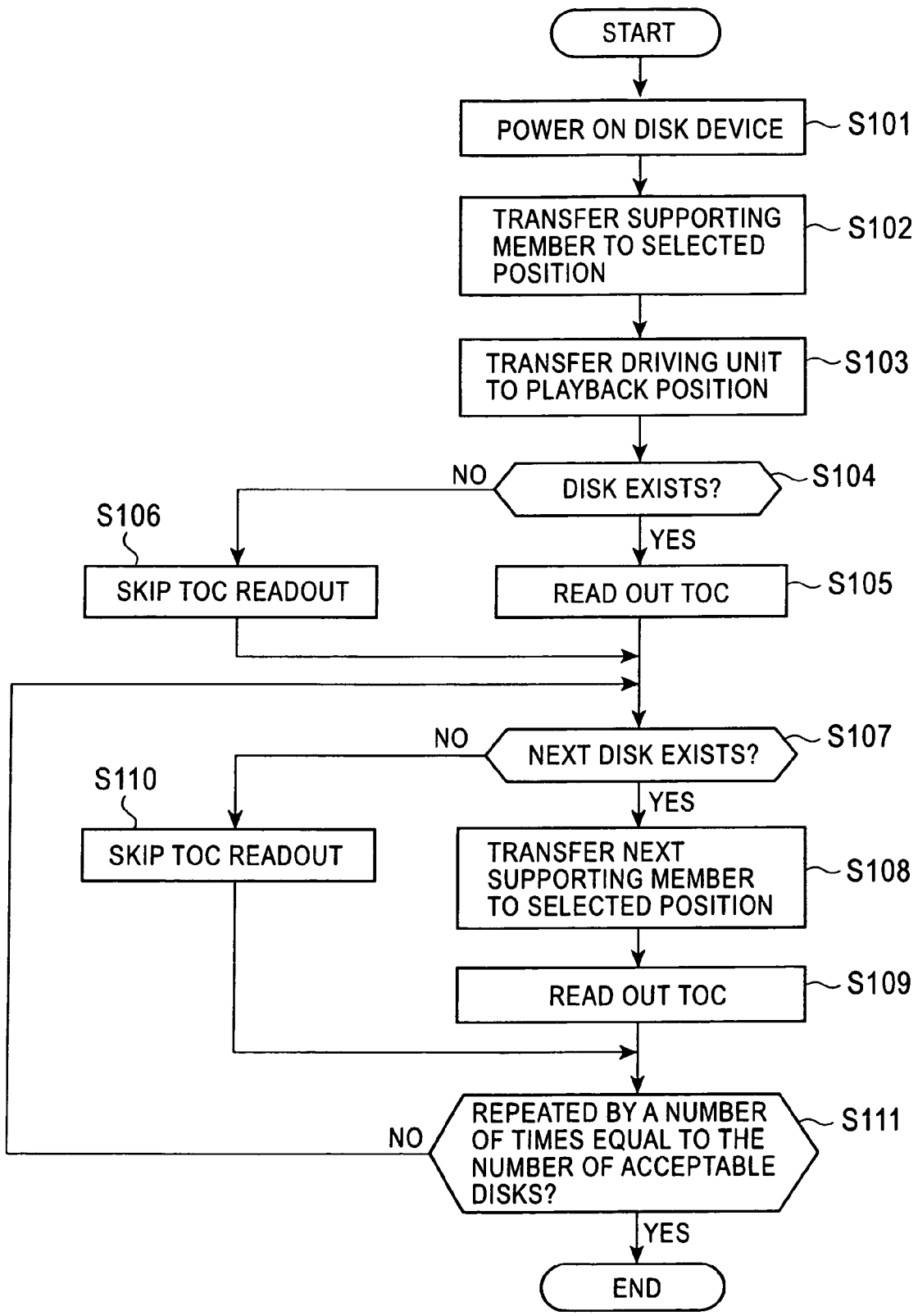
FIG. 8 is a flow chart illustrating operations for disk checks according to the embodiment.

Operations for disk checks in the disk device according to this embodiment will now be described with reference to a flow chart shown in FIG. 8. The disk checks are preferably performed from the supporting member 14-1 located at the top of the disk tray to the supporting member 14-5 located at the bottom, or conversely from the supporting member 14-5 located at the bottom to the supporting member 14-1 located at the top. In the following description, the disk checks are performed from the supporting member at the bottom to the supporting member at the top.

When the disk device is powered on (Step S101), disk checks for checking the content of the accommodated disks are performed as an initial operation.

Figure 4A:
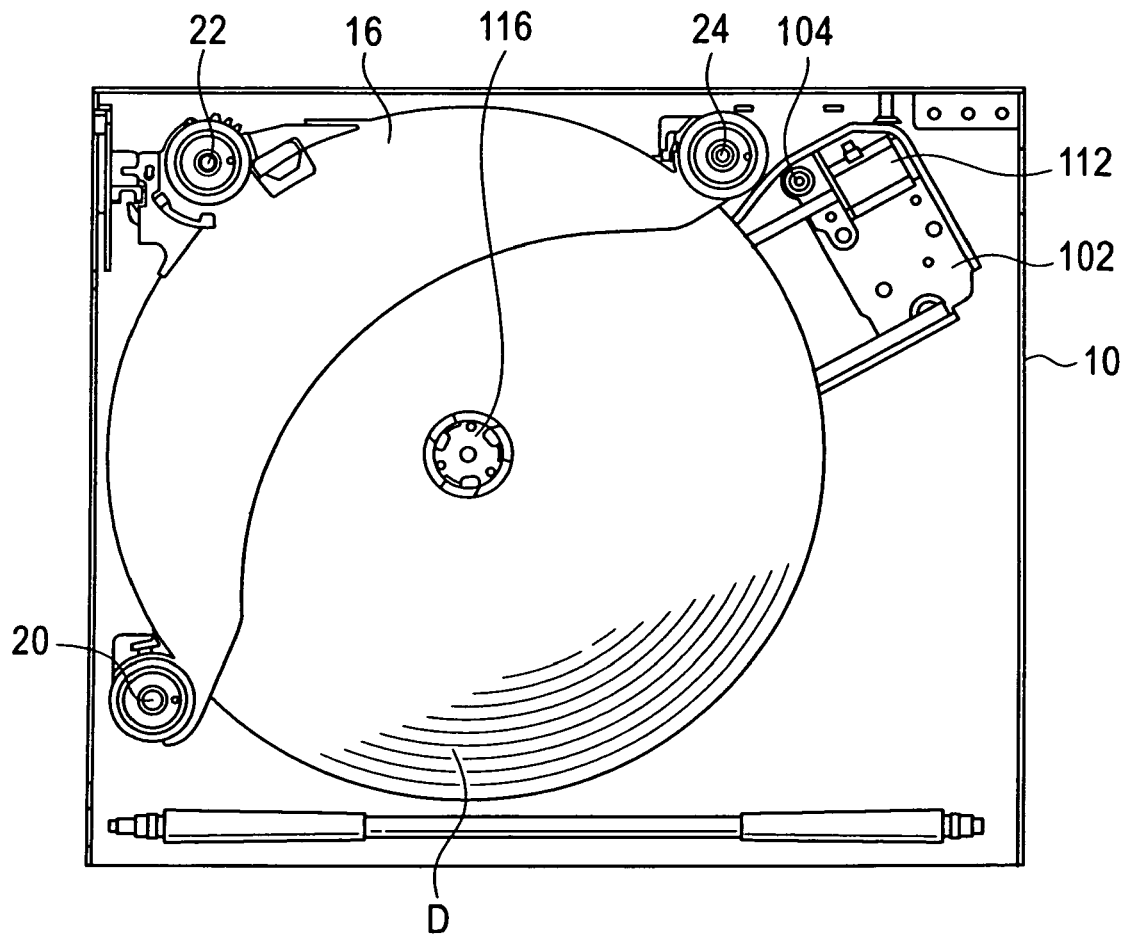
FIGS. 4A and 4B are a plan view and a side view, respectively, of the disk device while the disk is accommodated therein and the driving unit is disposed at the playback position.
Figure 4B:
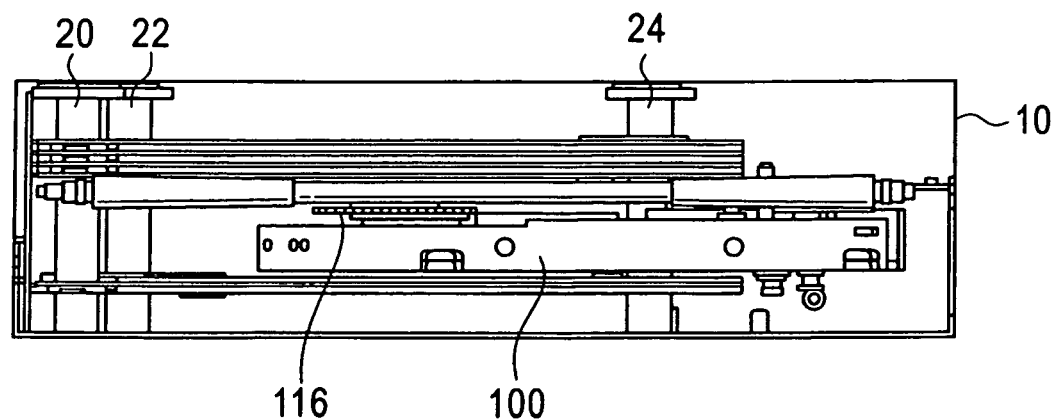

The controlling section 300 transfers the supporting member 14-5 at the bottom of the disk tray 16 to the selected position shown in FIG. 5B while the driving unit 100 is at the retracted position (Step S102). The controlling section 300 then transfers the driving unit 100 to the playback position shown in FIGS. 4A and 4B (Step S103). Next, the controlling section 300 determines whether a disk is accommodated in the supporting member 14-5 with reference to the detection result from the disk detector 200 attached to the supporting member 14-5 (Step S104).

When a disk is accommodated, the disk is lifted by the turntable 116, chucked, and rotated such that the TOC is read out by the optical head 114 (Step S105). The TOC information is stored in the memory 310. When no disk is accommodated in the supporting member 14-5, the TOC readout for the supporting member 14-5 is skipped (Step S106). At this time, the driving unit 100 remains at the playback position.

Next, the controlling section 300 determines whether a disk is accommodated in the supporting member 14-4 at the second position from the bottom (Step S107). When a disk is accommodated in the supporting member 14-4 and a disk is also accommodated in the supporting member 14-5, the driving unit 100 is temporarily transferred to the retracted position. The supporting member 14-4 is then transferred to the selected position, and the driving unit 100 is transferred to the playback position.

On the other hand, when a disk is accommodated in the supporting member 14-4 but no disk is accommodated in the supporting member 14-5, the supporting member 14-4 is transferred to the selected position while the driving unit 100 is kept at the playback position (Step S108). Since no disk is in the supporting member 14-5, it is not necessary to transfer the driving unit 100 to the retracted position for preventing the collision with the disk. In this manner, the TOC of the disk accommodated in the supporting member 14-4 is read out, and the information is stored in the memory 310 (Step S109).

When no disk is accommodated in the supporting member 14-4, the TOC readout is skipped (Step S110).

The controlling section 300 determines whether the disk checks are repeated by a number of times equal to the number of acceptable disks (Step S111). When all the disk checks are not completed, the controlling section 300 determines whether a disk is accommodated in the next supporting member 14-3. When a disk is accommodated, the supporting member 14-3 is transferred to the selected position, and the TOC of the disk is read out in the same manner as above. When no disks are accommodated in the supporting members 14-5 and 14-4, the supporting member 14-3 is transferred to the selected position in a single motion while the driving unit 100 is kept at the playback position.

In this manner, the disk checks of the accommodated disks are performed in order from the supporting member 14-5 to the supporting member 14-1. Then, on the basis of the TOC information stored in the memory 310, a list of the content of all the accommodated disks is shown on a display or the like.

In the disk checks according to the known technology, the driving unit always needs to be transferred from the retracted position to the playback position. However, in the disk check according to this embodiment, the supporting member is transferred to the selected position for the TOC readout by the driving unit 100 only when the disk is accommodated in the supporting member. As a result, the disk checks are efficiently performed in a short time even when not all of the supporting members of the disk tray 16 accommodate disks, and the standby time before the use of the disk device can be reduced.

In the above-described embodiment, the disk checks are performed from the supporting member at the bottom to the supporting member at the top. However, the same effect can be accomplished when the disk checks are performed conversely from the supporting member at the top to the supporting member at the bottom.

A second embodiment of the present invention will now be described. In the first embodiment, the presence of the disks is determined from the detection results of the disk detectors 200 that are attached to the respective supporting members. However, in the second embodiment, the presence of the disks is determined by the optical head 114 instead of the disk detectors 200.

The optical head 114 emits a light beam from a light source, receives a light beam reflected from a disk surface, and converts the light energy into electrical energy. When the converted signal does not reach a threshold level, in other words, when the TOC cannot be read out, it is determined that no disk is accommodated.

In the second embodiment, the supporting members 14-1 to 14-5 do not need the disk detectors 200, resulting in a simplified structure of the disk device.

Figure 9:
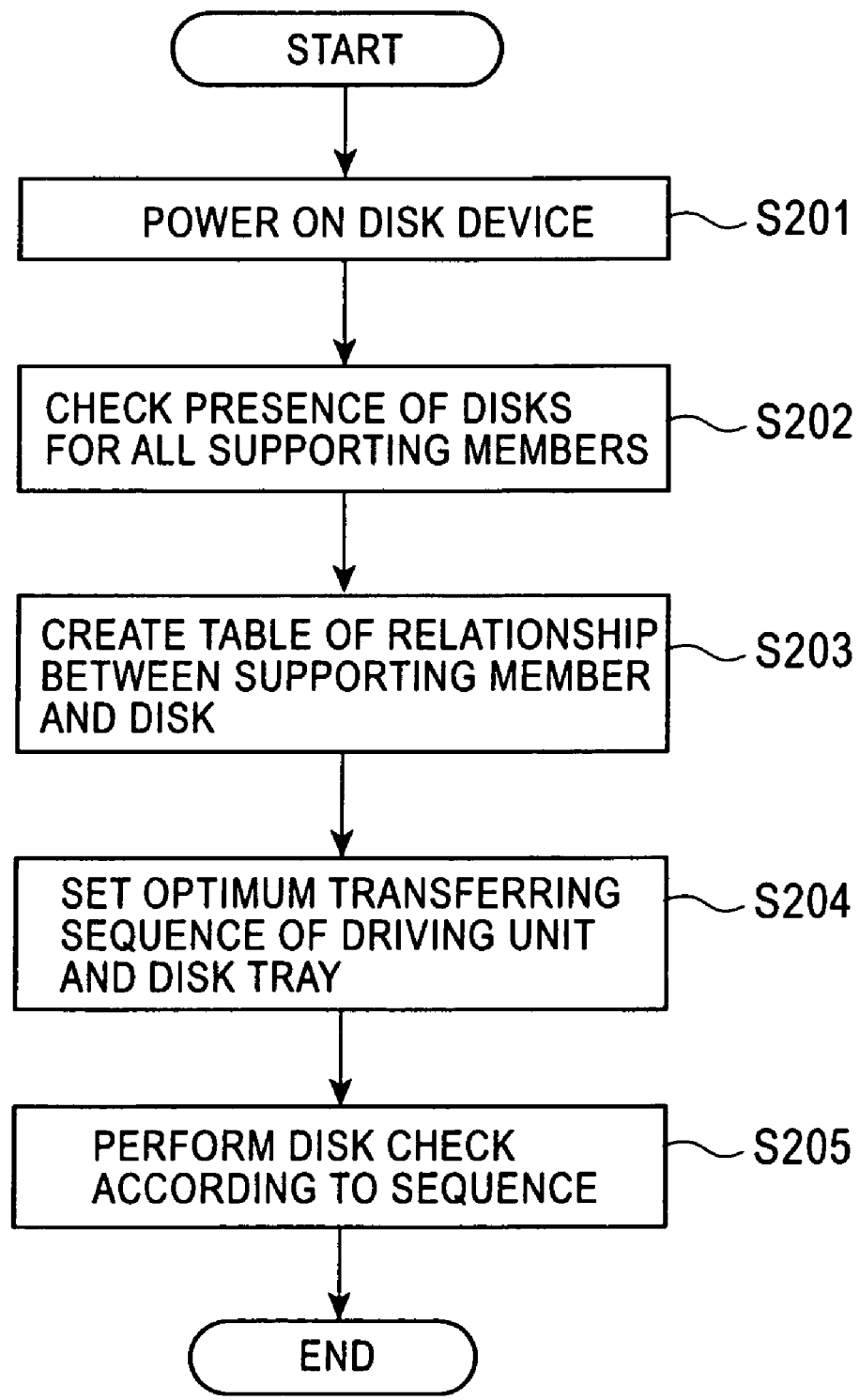
FIG. 9 is a flow chart illustrating operations for disk checks according to another embodiment.
Figure 11:
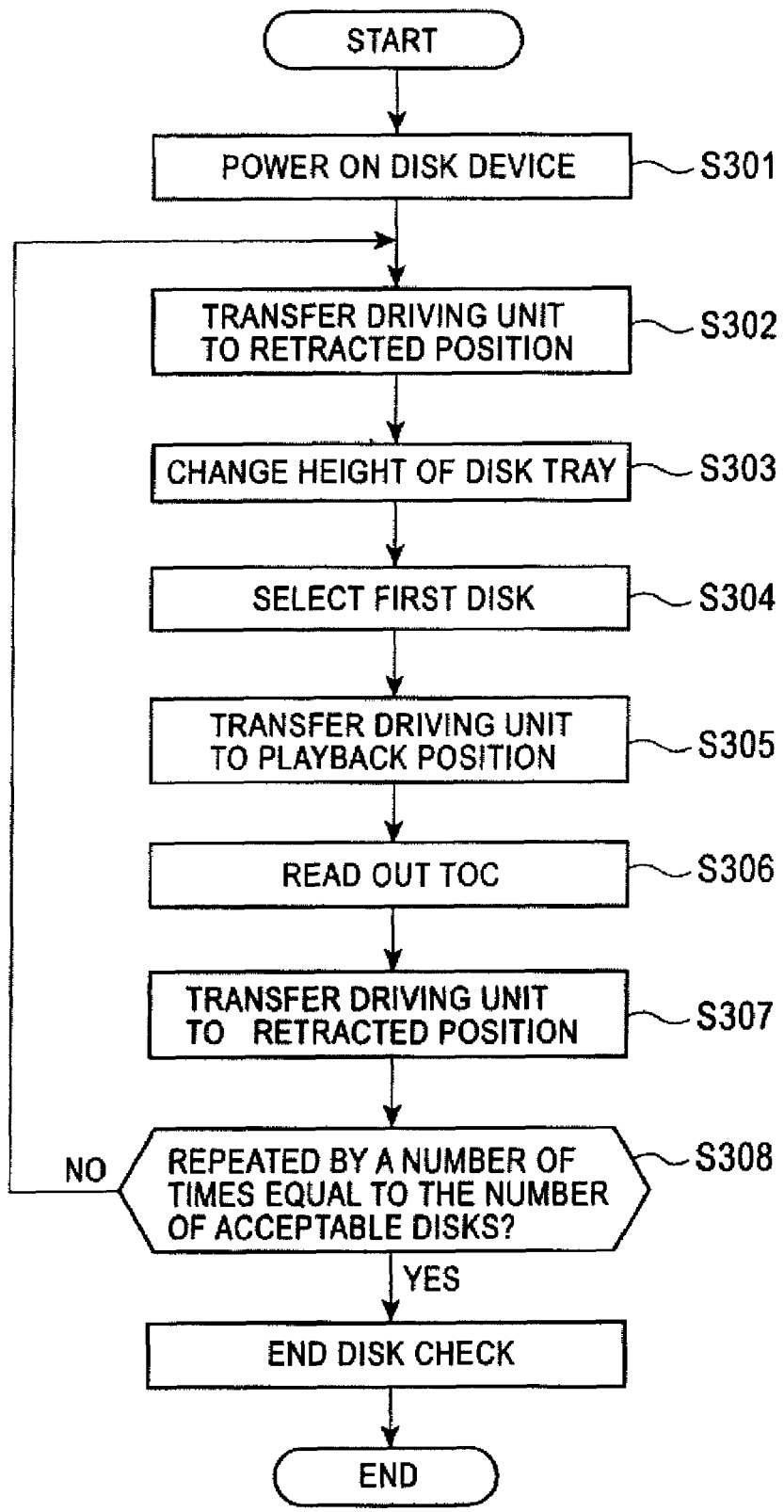
FIG. 11 is a flow chart illustrating operations for disk checks in a known disk device.

A third embodiment of the present invention will now be described. FIG. 9 is a flow chart illustrating operations for disk checks according to the third embodiment. When the disk device is powered on (Step S201), the controlling section 300 checks which supporting members accommodate disks with reference to the detection results of the disk detectors 200 of all the supporting members 14-1 to 14-5 (Step S202).

Next, the controlling section 300 creates a table shown in FIG. 10 illustrating the relationships between the supporting members and the presence of the disks on the basis of the detection results of the disk detectors (Step S203). On the basis of this table, an optimum sequence for transferring the disk tray 16 and the driving unit 100 is set, and stored in the memory 310 (Step S204). Then, the controlling section 300 controls the first driving motor 320 and the second driving motor 330 depending on the transferring sequence such that the disk checks for all the accommodated disks are performed (Step S205). The optimum transferring sequence set in advance facilitates the minimum and efficient transfer of the driving unit 100 and the disk tray 16.

A fourth embodiment of the present invention will now be described. The fourth embodiment is applied to a so-called all-ejecting function for ejecting all the disks accommodated in the disk device. When the disks are ejected, the driving unit 100 is disposed at the playback position shown in FIGS. 2A and 2B in order to assist the transport of the disks. In the known method, for example, when all the disks accommodated in the supporting members are transported from the supporting member at the bottom to the supporting member at the top, the driving unit is transferred from the retracted position to the playback position every time the supporting members are transferred to the selected position regardless of the presence of the disks. By contrast, in the fourth embodiment, when no disk is accommodated in the supporting member at the selected position, the disk tray 16 is transferred such that the next supporting member having a disk reaches the selected position while the driving unit 100 is kept at the playback position. As a result, the time required for the all-ejecting function can be reduced when not all of the supporting members of the disk tray accommodate disks.

A fifth embodiment of the present invention will now be described. The fifth embodiment is applied to a so-called all-loading function for loading disks into all the supporting members of the disk tray of the disk device. As in the case for the disk ejection, the driving unit 100 assists the transport of the disks inserted from the loading slot 26. When the disk detectors 200 detect that no disks are accommodated in the disk tray, the supporting member 14-1 at the top of the disk tray is transferred to the selected position, and a disk is loaded while the driving unit 100 is disposed at the playback position. Subsequently, while the driving unit 100 is kept at the playback position, the supporting member 14-2 is transferred to the selected position, and another disk is loaded. In this manner, the disks are loaded into all the supporting members while the driving unit 100 is kept at the playback position. When the all-loading function is performed, it should be noted that the disk tray is transferred from the supporting member 14-1 to the supporting member 14-5.

Moreover, when some of the supporting members of the disk tray already accommodate disks upon the disk loading, the driving unit 100 is transferred from the playback position to the retracted position as appropriate so as not to collide with the accommodated disks. However, when no disks are accommodated in at least two successive supporting members of the disk tray, the disks can be loaded while the driving unit is kept at the playback position.

In the above-described embodiments, each of the disk detectors 200 includes the rotating lever 210 and the photosensor 220. However, the structure is merely an example, and various detectors instead of the disk detectors 200 are permissible.

Although the preferred embodiments of the present invention are described above, the technical scope of the present invention is not limited to the specific embodiments, and modifications are permissible within the scope and spirit of the present invention.

The disk device according to the present invention can be used as a disk device of a changer type capable of recording and/or playing back CDs and DVDs. Furthermore, the disk device can be used in apparatuses or systems including navigation devices, audiovisual (AV) devices, computer devices and the like combined with each other.

What is claimed is:

1. A disk device comprising:
    a disk tray capable of accommodating disks that are stacked in the axial direction;
    a first transferring component for transferring the disk tray in the disk-stacking direction;
    a driving unit comprising a head for optically reading out data recorded in the disks, and a supporting component for supporting the rotation of the disks;
    a second transferring component for selectively transferring the driving unit between a playback position where the driving unit overlaps with the disks in the disk-stacking direction and a retracted position where the driving unit does not overlap with the disks in the disk-stacking direction;
    a disk-detecting component for determining whether the disk tray accommodates disks at predetermined positions; and
    a controlling section for transferring the disk tray in the disk-stacking direction with the first transferring component while the driving unit is kept at the playback position on the basis of detection results of the disk-detecting component.

2. The disk device according to claim 1, wherein
    during disk checks of the disks accommodated in the disk tray, the controlling section transfers the disk tray in the disk-stacking direction with the first transferring component while the driving unit is kept at the playback position when the disk tray does not accommodate disks at predetermined positions on the basis of the detection results of the disk-detecting component.

3. The disk device according to claim 2, wherein the controlling section transfers the disk tray such that a predetermined disk accommodated in the disk tray is disposed at a selected position for readout by the driving unit.

4. The disk device according to claim 3, wherein the disk-detecting component comprises a disk-detecting unit for each possible disk accommodated in the disk tray, and each of the disk-detecting units comprises an adjustable member that changes position when the disk tray accommodates a disk at a predetermined position and a sensor for detecting the change in position of the adjustable member.

5. The disk device according to claim 3, wherein the disk-detecting component detects the presence of a disk on the basis of a signal read out by the head of the driving unit.

6. The disk device according to claim 1, wherein during ejecting of all the disks accommodated in the disk tray, the controlling section transfers the disk tray in the disk-stacking direction with the first transferring component while the driving unit is kept at the playback position when the disk tray does not accommodate disks at predetermined positions on the basis of the detection results of the disk-detecting component.

7. The disk device according to claim 6, wherein the disk-detecting component comprises a disk-detecting unit for each possible disk accommodated in the disk tray, and each of the disk-detecting units comprises an adjustable member that changes position when the disk tray accommodates a disk at a predetermined position and a sensor for detecting the change in position of the adjustable member.

8. The disk device according to claim 6, wherein the disk-detecting component detects the presence of a disk on the basis of a signal read out by the head of the driving unit.

9. The disk device according to claim 1, wherein during loading of a plurality of disks into the disk tray, the controlling section transfers the disk tray in the disk-stacking direction with the first transferring component while the driving unit is kept at the playback position when the disk tray does not accommodate disks at predetermined positions on the basis of the detection results of the disk-detecting component.

10. The disk device according to claim 9, wherein the disk-detecting component comprises a disk-detecting unit for each possible disk accommodated in the disk tray, and each of the disk-detecting units comprises an adjustable member that changes position when the disk tray accommodates a disk at a predetermined position and a sensor for detecting the change in position of the adjustable member.

11. The disk device according to claim 9, wherein the disk-detecting component detects the presence of a disk on the basis of a signal read out by the head of the driving unit.

12. A method for checking disks in a disk device, the disk device comprising a disk tray capable of accommodating disks that are stacked in the axial direction, a first transferring component for transferring the disk tray in the disk-stacking direction, a driving unit comprising a head for optically reading out data recorded in the disks and a supporting component for supporting the rotation of the disks, and a second transferring component for selectively transferring the driving unit between a playback position where the driving unit overlaps with the disks in the disk-stacking direction and a retracted position where the driving unit does not overlap with the disks in the disk-stacking direction, comprising:

detecting whether the disk tray accommodates disks at predetermined positions for checking all possible disks accommodated in the disk tray;

transferring the disk tray in the disk-stacking direction with the first transferring component while the driving unit is kept at the playback position when the disk tray does not accommodate disks at predetermined positions on the basis of the detection results; and transferring the disk tray such that a predetermined disk accommodated in the disk tray is disposed at a selected position for readout by the driving unit.

13. A method for ejecting disks from a disk device, the disk device comprising a disk tray capable of accommodating disks that are stacked in the axial direction, a first transferring component for transferring the disk tray in the disk-stacking direction, a driving unit comprising a head for optically reading out data recorded in the disks and a supporting component for supporting the rotation of the disks, and a second transferring component for selectively transferring the driving unit between a playback position where the driving unit overlaps with the disks in the disk-stacking direction and a retracted position where the driving unit does not overlap with the disks in the disk-stacking direction, comprising:

detecting whether the disk tray accommodates disks at predetermined positions for ejecting all disks accommodated in the disk tray;

transferring the disk tray in the disk-stacking direction with the first transferring component while the driving unit is kept at the playback position when the disk tray does not accommodate disks at predetermined positions on the basis of the detection results; and transferring the disk tray such that a predetermined disk accommodated in the disk tray is disposed at a selected position for ejecting the disk.

14. A method for loading disks into a disk device, the disk device comprising a disk tray capable of accommodating disks that are stacked in the axial direction, a first transferring component for transferring the disk tray in the disk-stacking direction, a driving unit comprising a head for optically reading out data recorded in the disks and a supporting component for supporting the rotation of the disks, and a second transferring component for selectively transferring the driving unit between a playback position where the driving unit overlaps with the disks in the disk-stacking direction and a retracted position where the driving unit does not overlap with the disks in the disk-stacking direction, comprising:

detecting whether the disk tray accommodates disks at predetermined positions for loading a plurality of disks into the disk tray;

transferring the disk tray in the disk-stacking direction with the first transferring component while the driving unit is kept at the playback position when the disk tray does not accommodate disks at predetermined positions on the basis of the detection results; and loading disks into the disk tray at the predetermined positions.

* * * * *